(12) United States Patent
Awasthi et al.

(10) Patent No.: US 6,708,229 B2
(45) Date of Patent: Mar. 16, 2004

(54) CONFIGURING COMPUTER COMPONENTS

(75) Inventors: Vinay K. Awasthi, Hillsboro, OR (US); Hiremane S. Radhakrishna, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 308 days.

(21) Appl. No.: 09/750,238

(22) Filed: Dec. 27, 2000

(65) Prior Publication Data

US 2002/0083226 A1 Jun. 27, 2002

(51) Int. Cl.$^7$ .............. G06F 13/10; G06F 13/12

(52) U.S. Cl. .............. 710/8; 710/10; 710/15; 710/16; 710/104; 709/321; 707/1; 713/189

(58) Field of Search ............... 710/8, 10, 15, 710/16, 104; 709/321; 713/189; 707/1

(56) References Cited

U.S. PATENT DOCUMENTS

| | | | |
|---|---|---|---|
| 5,586,324 A | | 12/1996 | Sato et al. .................. 395/652 |
| 5,809,329 A | * | 9/1998 | Lichtman et al. ............... 710/8 |
| RE36,394 E | | 11/1999 | Advani et al. .............. 395/653 |
| 6,125,108 A | * | 9/2000 | Shaffer et al. .............. 370/259 |
| 6,310,876 B1 | * | 10/2001 | Egbert ........................ 370/389 |
| 6,370,599 B1 | * | 4/2002 | Anand et al. ................. 710/15 |
| 6,405,265 B1 | * | 6/2002 | Kronenberg et al. ........ 709/321 |
| 6,426,798 B1 | * | 7/2002 | Yeung ....................... 358/1.13 |
| 6,487,608 B2 | * | 11/2002 | Gifford et al. ................. 710/8 |
| 6,496,893 B1 | * | 12/2002 | Arai ........................... 710/302 |

* cited by examiner

*Primary Examiner*—Rehana Perveen
(74) *Attorney, Agent, or Firm*—Fish & Richardson P.C.

(57) ABSTRACT

Techniques for configuring network interface cards include storing device information related to multiple network interface card, and configuring the network interface cards based on the stored device information using a device driver. Techniques for installing a peripheral device, include initiating a search of stored device information by a device driver, receiving in the device driver information about the peripheral device in response to the search, and configuring the device using the received information.

27 Claims, 4 Drawing Sheets

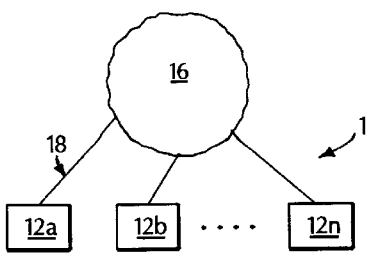
FIG. 1
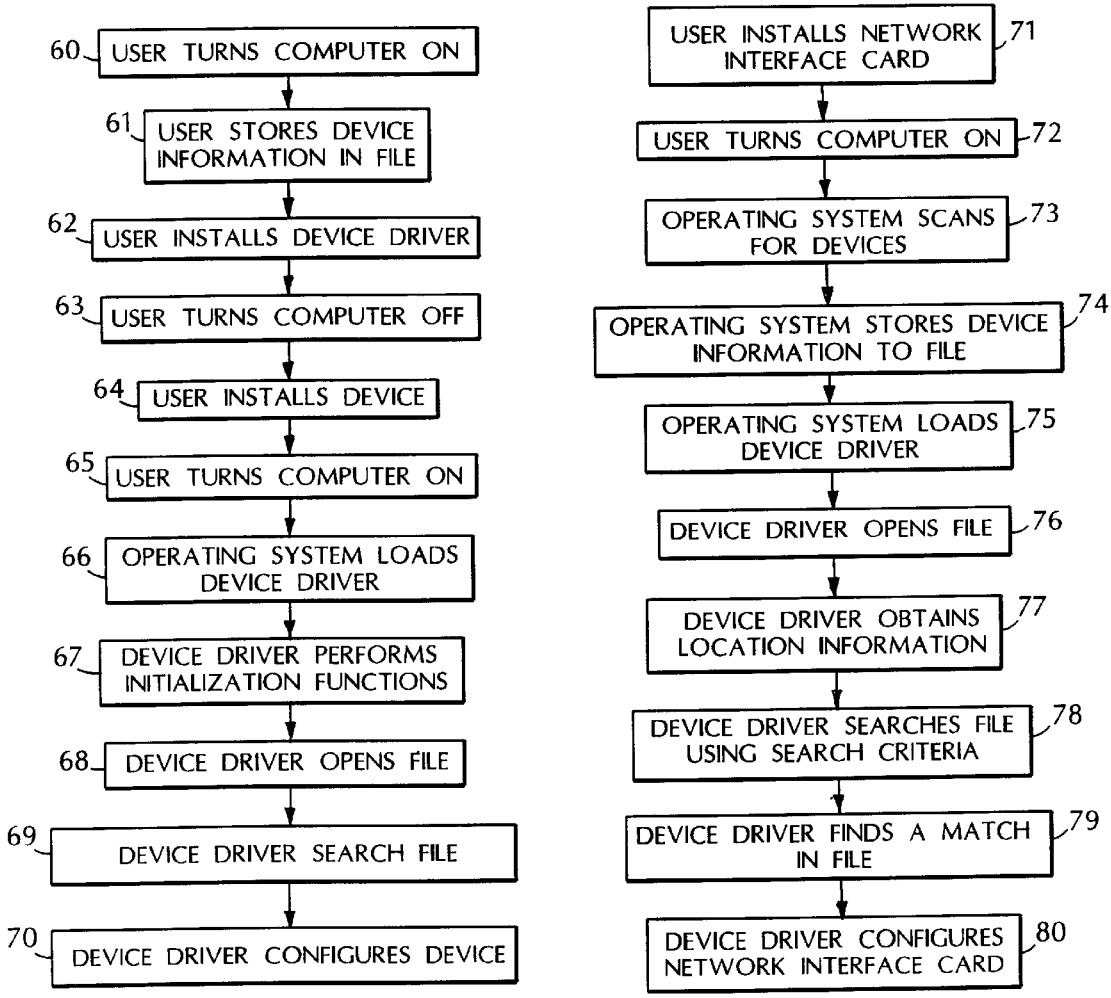
FIG. 4
FIG. 6

CONFIGURING COMPUTER COMPONENTS

BACKGROUND

The invention relates to configuring computer components.

Computer systems commonly are connected to several different types of network systems which can be arranged according to many physical and logical topologies. Each network system topology uses a separate hardware interface adapter called a network interface card (NIC). Communications properties of each NIC, such as speed of transmission, must be individually configured. However, a single computer system is typically limited to one type of network topology and, thus, one type of NIC.

The hardware and software computer components of computer systems are often upgraded to keep their technology current. The upgrade procedure is often done by a system administrator or an individual with expertise in both computer operating systems (OS) and computer networks. The procedure can involve repetitive rebooting of the computer system and reconfiguring of the new computer components.

BRIEF DESCRIPTION OF THE DRAWINGS

FIG. 1 illustrates a data processing system.

FIG. 4 is a flow chart of a method for configuring network interface cards according to the invention.

FIG. 6 is a flow chart of a method for configuring computer components according to the invention.

DETAILED DESCRIPTION

Figure 2:
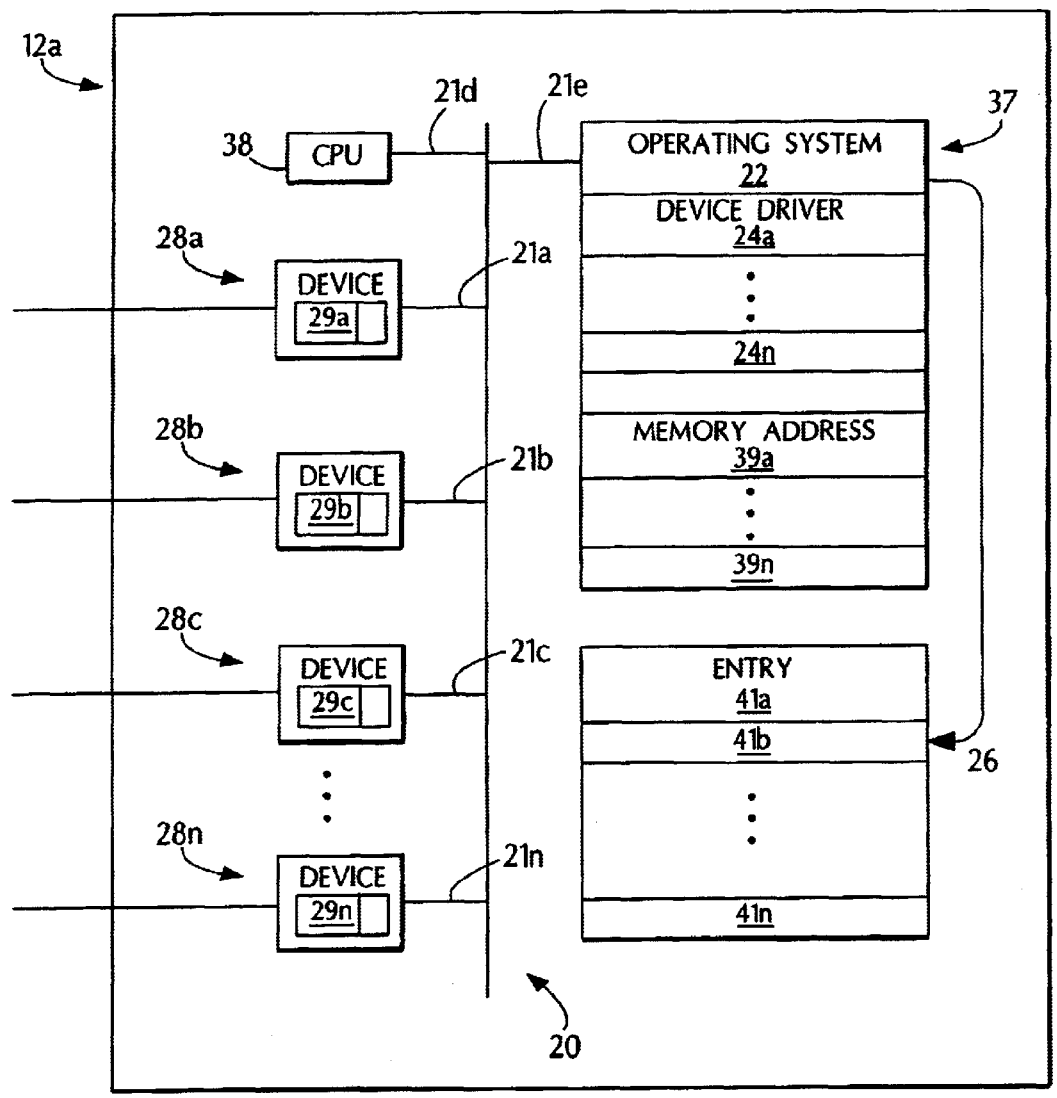
FIG. 2 is a block diagram of a computer system for configuring computer components according to the invention.

As shown in FIG. 1, a data processing system 1 includes multiple computer systems 12a, 12n connected to a network system 16. The network system 16 can be configured, for example, as a local area network (LAN) or a wide area network (WAN). The network system 16 allows a computer system, such as the system 12a, to exchange information with another computer system, such as system 12b. Each computer system 12a, 12n is connected to the network system 16 through a respective communications medium 18 such as a wire, optical, or wireless medium.

As shown in FIG. 2, the computer system 12a includes a central processing unit (CPU) 38 which is responsible for executing programs and for processing data stored in main memory 37. The main memory 37 can include dynamic random access memory (DRAM) or other memory.

Peripheral devices 28a, 28n can be attached to the computer system 12a. Peripheral devices 28a, 28n are computer components or hardware devices that provide additional functionality and capability to the basic set of computer system functions. Examples of such peripheral devices 28a, 28n include a video terminal, keyboard, mass-storage device, and network interface cards (NICs).

The computer bus 20 is a data path on the computer system 12a that facilitates the interconnection of the CPU 38 with computer components, such as peripheral devices 28a, 28n. In one embodiment, the computer bus 20 includes multiple slots 21a, 21n each of which is typically a hardware connector on the motherboard of the computer system 12a where peripheral devices 28a, 28n are attached. In one embodiment, each slot 21a, 21n is assigned a bus-number and slot-number.

Each peripheral device 28a, 28n is typically designed and manufactured with a set of identification marks 29a, 29n. These identification marks are specific to each vendor/manufacturer and device type and enable programs to identify them. The CPU 38 communicates with each peripheral device 28 based on its unique memory base address 39a, 39n within the memory address space of main memory 37.

The operating system (OS) 22 is the main program that manages other programs in the computer system 12a. It is loaded onto the main memory 37 when the computer system 12a is booted. The OS 22 creates and maintains a resource and configuration file 26 in which it stores information related to installed peripheral devices 28a, 28n. The OS 22 creates and maintains the configuration file 26 by creating a separate entry 41a, 41n in the file 26 for each device that it identifies. Once the OS 22 identifies a peripheral device 28a, 28n, it acquires device information such as vendor and device-identification 29a, 29n, bus and slot-number 21a, 21n, and memory base address 39a, 39n. The OS 22 stores the information it acquires from each device 28a, 28n in its own entry 41a, 41n.

Programs called device drivers 24a, 24n are loaded onto the main memory 37 when the computer system 12a is turned on. Each device driver 24a, 24n is responsible for controlling a corresponding peripheral device 28a, 28n. Some device drivers 24a, 24n can control and manage more than one peripheral device 28a, 28n.

Figure 3:
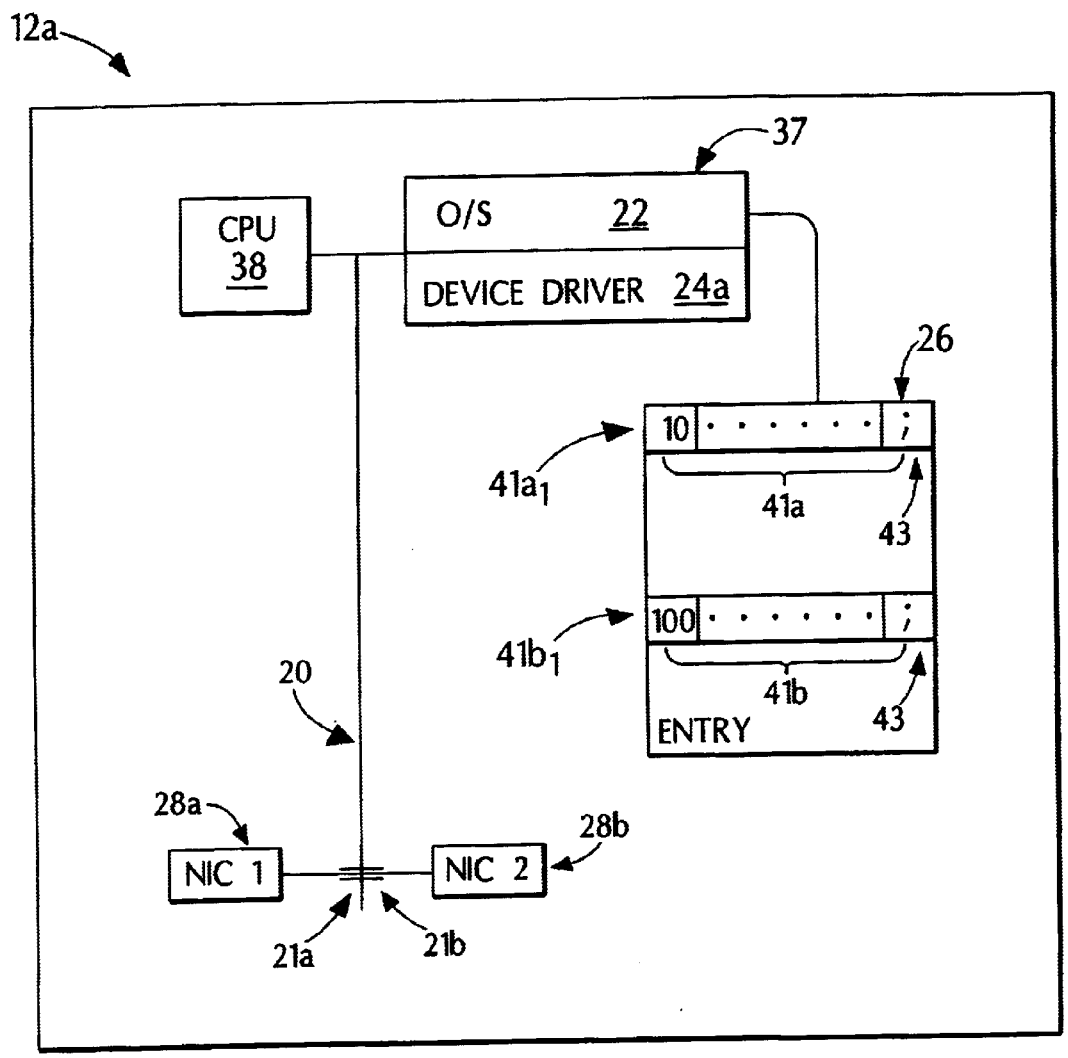
FIG. 3 is a block diagram illustrating one embodiment for configuring network interface cards according to the invention.

As illustrated in FIG. 3, the computer system 12a may have multiple NICS attached to computer bus 20. In one embodiment, peripheral device 28a, designated as NIC1, is attached to slot 21a and peripheral device 28b, designated as NIC2, is attached to slot 21b. Each NIC can be connected to a different network system (not shown), for example, NIC1 can be configured to operate with a 10 Megabit-per-second (Mps) Ethernet network and NIC2 can be configured to operate with a high-speed 100 Mps Ethernet network.

The OS 22 manages the computer system 12a including maintaining the computer file 26 and loading the device driver 24a. As shown in FIG. 3, a device driver 24a controls and manages both NICs. The operational properties of each NIC are stored in the computer file 26 as a list of separate entries, for example, entry 41a corresponds to NIC1 and entry 41b corresponds to NIC2. A special character 43, such as a comma, is used to separate the entries 41a and 41b. Each entry includes several fields. For example, entry 41a has a communication speed property field 41a-1 which is set, in the illustrated example, to the value 10 representing a speed of 10 Mps. Other fields can include communications properties such as flow control and duplex setting.

Operation of the system is now explained. As illustrated in FIG. 4, a user turns on 60 the computer system 12a causing the OS 22 to be loaded. Once the OS 22 is loaded and running, the operational and communications properties of each NIC are stored 61 in the special computer file 26 by a user or system administrator. For example, the user can store the properties for NIC1 in entry 41a. The user then enters the character 43 to separate the next entry 41b for NIC2. The user installs 62 device driver 24a which will control both NIC1 and NIC2. After the driver 24a is installed, the computer system is turned off 63 and each NIC is installed 64 on the bus 20. Once the device driver 24a and the NICs have been installed, the computer system 12a is turned on 65 causing the OS 22 to be loaded. As the OS 22 is loaded, it takes control of the computer system 12a and loads 66 the device driver 24a. As the device driver 24a is loaded, it executes initialization procedures 67 for the corresponding NICs. These procedures may include ascertaining the physical location, such as the slot-number and bus-number, of each NIC installed on the computer bus 20.

Once the OS 22 loads the device driver 24a, it opens 68 the configuration file 26 and searches 69 for the entries 41a–41b in the file 26 corresponding to the NIC it is controlling. After the device driver 24a locates the particular entry 41a–41b, it parses 70 the entry for the operational properties of the NIC it is controlling. This includes separating the sets of properties corresponding to the two NICs. For example, the driver 24a locates and then parses entry 41a for NIC1 and then proceeds to process entry 41b for NIC2. In a Solaris™ OS environment, the device driver 24a issues a system call requesting the operational properties for the particular NIC. The system call executes the request and responds by returning the properties corresponding to the particular NIC.

Next, the device driver 24a configures 70 each NIC. For example, the driver 24a assigns the properties found in entry 41a to NIC 1 and assigns the properties found in entry 41b to NIC 2. Communications properties such as speed flow control, and duplex mode also can be used to configure each NIC.

The foregoing techniques can enable a computer system 12a to be configured with multiple NICs using a device driver 24a. Thus, a single computer system 12a can be capable of connecting to several different types of network systems 16.

Occasionally, a user may have to install or replace peripheral devices if, for example, one of the devices was damaged or became obsolete. Often, when the device is replaced, it may not be installed in the same location on the computer bus 20 as the original device. In one embodiment, illustrated in FIG. 5, device 28c is a video device and is attached to slot 21c and device 29d is a mass-storage device and is attached to slot 21d. Each device 28c, 28d has a corresponding memory base address 39c, 39d, an entry 41c, 41d in the configuration file 26, device/vendor identification mark 29c, 29d, and a corresponding device driver 24c, 24d.

As shown in FIG. 6, peripheral devices 28c, 28d are installed 71 in the computer system 12a when it is turned off. The computer system 12a is then turned on 72 to initiate the process of booting. This process includes loading the OS 22 onto the main memory 37 of the computer system 12a. As the OS 22 is loaded, it scans 73 its hardware environment and identifies the peripheral devices 28c, 28d that are attached to the computer bus 20.

For each device 28c, 28d the OS 22 identifies, it reads from the device any pertinent information and stores 74 it in the file 26. In a UnixWare™ OS environment, the file 26 created by the OS 22 is called a resource manager file and is used to store a separate entry 41c, 41d.

Figure 5:
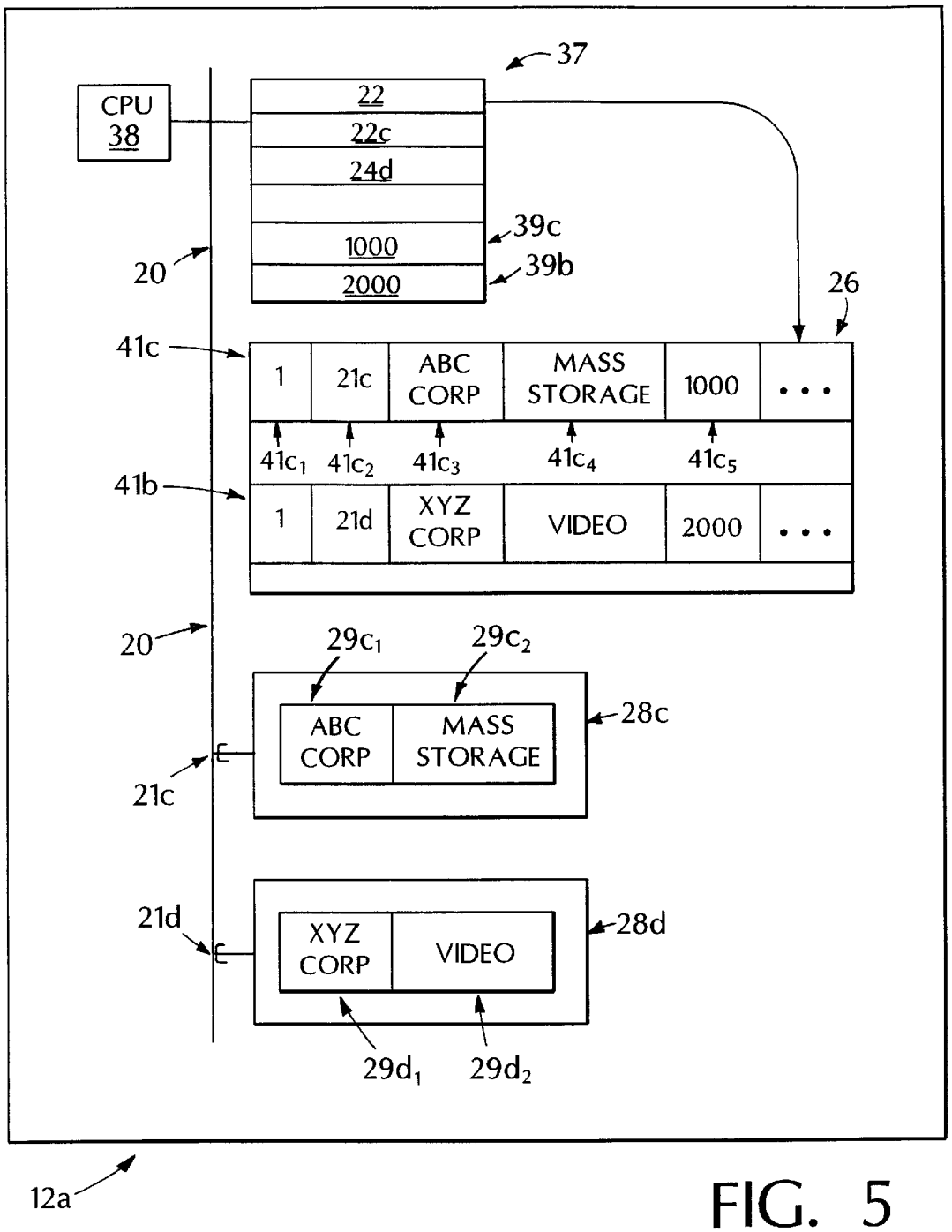
FIG. 5 is a block diagram illustrating another embodiment for configuring computer components according to the invention.

For example, as shown in FIG. 5, device 28c has a corresponding entry 41c containing pertinent information related to the device. Each entry 41c, 41d can contain multiple fields. For example, entry 41c is subdivided into field 41c-1, representing the physical bus number, and field 41c-2, representing the slot-number of device 28c. It also may include information specific to the manufacturer of the device. For example, field 41c-3 of device 28c, corresponding to the vendor-identification, is set to the vendor "ABC Corp," and field 41c-4, corresponding to the device-identification, is set to device type "Mass Storage". This information corresponds to the device-identification mark 29c-1 and vendor-identification mark 29c-2 of device 28c.

Other entry information may include the logical location of the device within the address space of the computer system 12a. For example, device 28c has memory base address field 41c-5 set to the value 1000. This value represents the memory location 39c of the device 28c in main memory 37 which is used by the CPU 38 to access the device. The OS 22 loads 75 into main memory 37 the device drivers 24c, 24d for each peripheral device 28c, 28d that is installed on the computer system 12a. That is, each device driver 24c, 24d is loaded one driver at a time. In other embodiments, a single driver may control multiple devices instead of single driver controlling a single device.

While each device driver 24c, 24d is being loaded, it opens 76 the resource manager file 26. The drivers 24c, 24d then determine 77 the information related to each device such as vendor and device-identification and slot/bus-number. In a UnixWare™ environment, the drivers 24c, 24d issue a system call requesting the device information including memory base address of each peripheral device 28c, 28d.

Each driver 24c, 24d then searches 78 the contents of the file 26 looking for an entry 41c, 41d for the device it is controlling. The criteria used to search the file 26 are based on the information the driver 24c, 24d acquired from the system call request, namely, base and slot-number, vendor and device-identification, and memory base address. The driver 24c, 24d searches the file 26 based on these criteria until it finds an entry 41c, 41d corresponding to the specified search criteria. The information in the entries 41c, 41d is matched against the information in the search criteria.

Once a match is found 79, the device 28c, 28d is configured 80 using information based on the memory base address 39c, 39d. As discussed above, the memory base address 39c, 39d represents the location of the device in the memory space of main memory 37. This address enables the computer system 12a to communicate with the device 28c, 28d. The process terminates by closing the information file 26. In a UnixWare™ environment, the device driver 24c, 24d closes the resource manager file 26. This process is repeated for each device driver 24c, 24d and corresponding device 28c, 28d that is installed on the computer system 12a.

The foregoing techniques can enable a computer user or system administrator to upgrade and replace hardware computer components with minimal intervention.

Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

Other implementations are within the scope of the following claims.

What is claimed is:

1. A method of configuring network interface cards comprising:

storing in a computer file device information related to network interface cards;

extracting the device information for each network interface card from the file using a device driver; and configuring the network interface cards based on the stored device information using a device driver.

2. The method of claim 1 including obtaining the device information from a computer file in a character-delimited format.

3. The method of claim 1 including acquiring the device information in response to a system call issued by the device driver.

4. An article comprising a computer-readable medium that stores computer-executable instructions for causing a computer system to:

store in a computer file device information related to a plurality of network interface cards;

extract the device information for each network interface card from the file using a device driver; and configure the network interface cards based on the stored device information using a device driver.

5. The article of claim 4 further comprising instructions to obtain the device information from a computer file in a character delimited format.

6. The article of claim 4 further comprising instructions to acquire device information in response to a system call issued by the device driver.

7. A computer system comprising:

a plurality of network interface cards;

a computer file containing device information related to each network interface card; and a device driver configured to retrieve the device information related to each network interface card, and configure the network interface cards based on the stored device information.

8. The system of claim 7 including a device driver configured to obtain the device information from a computer file in a character-delimited format.

9. The system of claim 7 including a device driver configured to acquire device information in response to a system call issued by the device driver.

10. The system of claim 9 wherein the information is from a file.

11. The system of claim 7 including a device driver configured to extract the device information for each network interface card from the file.

12. A method of installing a peripheral device comprising:

initiating a search of stored device information from a computer file using a device driver;

receiving information about the peripheral device in response to the search; and configuring the peripheral device using the received information.

13. The method of claim 12 wherein the device information includes location information of the peripheral device.

14. The method of claim 12 wherein the criteria used in the search includes a memory base address of the peripheral device.

15. The method of claim 12 wherein the search criteria includes a physical location of the peripheral device.

16. An article comprising a computer-readable medium that stores computer-executable instructions for causing a computer system to:

initiate a search of stored device information from a computer file by a device driver;

provide information about the peripheral device to the device driver in response to the search; and configure the peripheral device using the device driver and the provided information.

17. The article of claim 16 wherein the device information includes location information of the peripheral device.

18. The article of claim 16 wherein criteria used in the search includes a memory base address of the peripheral device.

19. The article of claim 16 wherein search criteria includes a physical location of the peripheral device.

20. A computer system comprising:

a plurality of peripheral devices;

a computer file containing information related to each peripheral device; and a device driver configured to initiate a search of stored device information by a device driver, receive information about the peripheral device in response to the search, and configure the device using the received information.

21. The system of claim 20 wherein the device information includes location information of the peripheral device.

22. The system of claim 20 wherein criteria used in the search includes a memory base address of the peripheral device.

23. The system of claim 20 wherein search criteria includes a physical location of the peripheral device.

24. A computer network comprising:

computer systems each including peripheral devices, a computer file containing device information related to each peripheral device, and a device driver configured to initiate a search of stored device information, receive information about the peripheral devices in response to the search, and configure the devices using the received information; and a communications link for inter-connecting the computer systems.

25. The network of claim 24 wherein the device information includes location information of the peripheral device.

26. The network of claim 24 wherein criteria used in the search includes a memory base address of the peripheral device.

27. The network of claim 24 wherein search criteria includes a physical location of the peripheral device.

* * * * *